United States Patent [19]
Be

[11] Patent Number: 6,109,627
[45] Date of Patent: Aug. 29, 2000

[54] BOWLING BALL CARRIER

[76] Inventor: Sung Hoan Be, 887-50 Kumdan-Dong Buk-Gu, Taegu, Rep. of Korea

[21] Appl. No.: 09/263,461

[22] Filed: Mar. 5, 1999

[30] Foreign Application Priority Data

Nov. 6, 1998 [KR] Rep. of Korea ............... 98-47737

[51] Int. Cl.$^7$ ....................................... B62B 1/12
[52] U.S. Cl. ................................ 280/47.19; 280/47.26; 190/18 A; 206/315.19
[58] Field of Search ................ 280/47.26, 654, 280/655, 47.19; 190/18 A; 206/315.19

[56] References Cited

U.S. PATENT DOCUMENTS

| | | | |
|---|---|---|---|
| 3,891,230 | 6/1975 | Mayer | 190/18 A |
| 4,066,156 | 1/1978 | Basile | 190/18 A |
| 5,074,571 | 12/1991 | Reese | 280/47.19 |
| 5,295,565 | 3/1994 | Latshaw | 190/18 A |
| 5,374,073 | 12/1994 | Hung-Hsin | 190/18 A |
| 5,549,318 | 8/1996 | Ho | 280/654 |
| 5,607,175 | 3/1997 | Bae | 280/47.19 |
| 5,664,652 | 9/1997 | Shamah | 190/18 A |
| 5,730,264 | 3/1998 | Lu | 190/18 A |
| 5,758,886 | 6/1998 | Mayer | 280/47.26 |
| 5,769,194 | 6/1998 | Chang | 280/37 |
| 5,791,469 | 9/1998 | Be | 190/18 A |

*Primary Examiner*—Michael Mar
*Assistant Examiner*—Elaine Gort
*Attorney, Agent, or Firm*—Richard T. Holzmann

[57] ABSTRACT

A bowling ball carrier, carrying two or three bags loaded with a plurality of bowling balls and allowing a user to easily receive or remove bowling balls into or from the bags, is disclosed. The bowling ball carrier has two parallel telescopic columns and a wheeled bag integrated with the lower ends of the telescopic columns. An upper bag holder frame, used for removably holding one or two bags in addition to the wheeled bag on the carrier, is attached to the carrier. The holder frame selectively engages with a locking beam of the two telescopic columns at its upper part. The wheeled bag may lie on its side. In such a case, the bag has a front opening capable of allowing a user to receive or remove bowling balls into or from the bag at the front of the bag. Alternatively, the wheeled bag may stand on its bottom. In such a case, the bag has a top opening capable of allowing a user to receive or remove bowling balls into or from the bag at the top of the bag. The opening of the wheeled bag is covered with a woven fabric lid or a synthetic resin lid.

9 Claims, 10 Drawing Sheets

BOWLING BALL CARRIER

BACKGROUND OF THE INVENTION

1. Field of the Invention

The present invention relates, in general, to bowling ball carriers and, more particularly, to a bowling ball carrier having one integrated bowling ball bag at the lower end and means for supporting two detachable bowling ball bags above the wheeled integrated bag in a three-tiered structure, each of the bowling ball bags being capable of receiving two bowling balls, thus easily carrying six bowling balls at the same time.

2. Description of the Prior Art

Typically, bowlers individually use several bowling balls with different colors, weights and finger holes in accordance with one's liking or in an effort to train systematically or to enjoy oneself by bowling positively. It is thus necessary for some bowlers to carry a plurality of bowling balls at the same time.

In order to carry a plurality of bowling balls in the prior art, two or more bags receiving bowling balls are loaded on a conventional wheeled carrier prior to fastening the bags together with the carrier into a wheeled package by a fastening means such as a fastening cord. However, such a carrier is inconvenient to users since the bags on the carrier have to be unfastened prior to unloading the uppermost bag from the carrier when it is necessary to use a ball received in a lower bag of the above fastened bags. When the bowling ball bags are carried while being fastened together with the carrier into a wheeled package as described above, the bags may be easily deformed and damaged due to the weight of the upper bags. This forces the users to purchase new bags. In an effort to overcome the above-mentioned problems, the inventor of this invention primarily proposed a bowling ball carrier provided with a means for supporting bowling ball bags in a multi-tiered structure in Korean U.M. Application No. 95-28868. However, the above carrier is designed to carry a plurality of bags in a multi-tiered structure, thus being inconvenient to users while receiving or removing bowling balls into or from the bags. In addition, the means for supporting bowling ball bags in a multi-tiered structure has a complex construction and is deformed or damaged when the carrier is used for a lengthy period of time. Therefore, the inventor of this invention also proposed another bowling ball carrier in U.S. Pat. No. 5,791,469 (Korean U.M. Application No. 96-1151). The carrier, disclosed in U.S. Pat. No. 5,791,469, somewhat stably and firmly holds two bowling ball bags without allowing the bags to be deformed or damaged. This carrier is also convenient to users while receiving or removing bowling balls into or from the bags. However, the carrier of U.S. Pat. No. 5,791,469 is problematic in that the structure of the carrier is only designed to effectively hold two bags, thus being undesirably overloaded and damaged when a third bag is added to the two bags on the carrier.

SUMMARY OF THE INVENTION

Accordingly, the present invention has been made keeping in mind the above problems occurring in the prior art, and an object of the present invention is to provide a bowling ball carrier, which effectively and stably holds two or three bags without being overloaded or damaged due to the bags.

In order to accomplish the above object, the present invention provides a bowling ball carrier capable of carrying two or three bags loaded with a plurality of bowling balls and allowing a user to easily receive or remove bowling balls into or from the bags. The bowling ball carrier has two parallel telescopic columns and a wheeled bag integrated with the lower ends of the telescopic columns. An upper bag holder frame, used for removably holding one or two bags in addition to the wheeled bag on the carrier, is attached to the carrier. The holder frame selectively engages with a locking beam of the two telescopic columns at its upper part. The wheeled bag may lie on its side. In such a case, the bag has a front opening capable of allowing a user to receive or remove bowling balls into or from the bag at the front of the bag. Alternatively, the wheeled bag may stand on its bottom. In such a case, the bag has a top opening capable of allowing a user to receive or remove bowling balls into or from the bag at the top of the bag. The opening of the wheeled bag is covered with a woven fabric lid or a synthetic resin lid.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
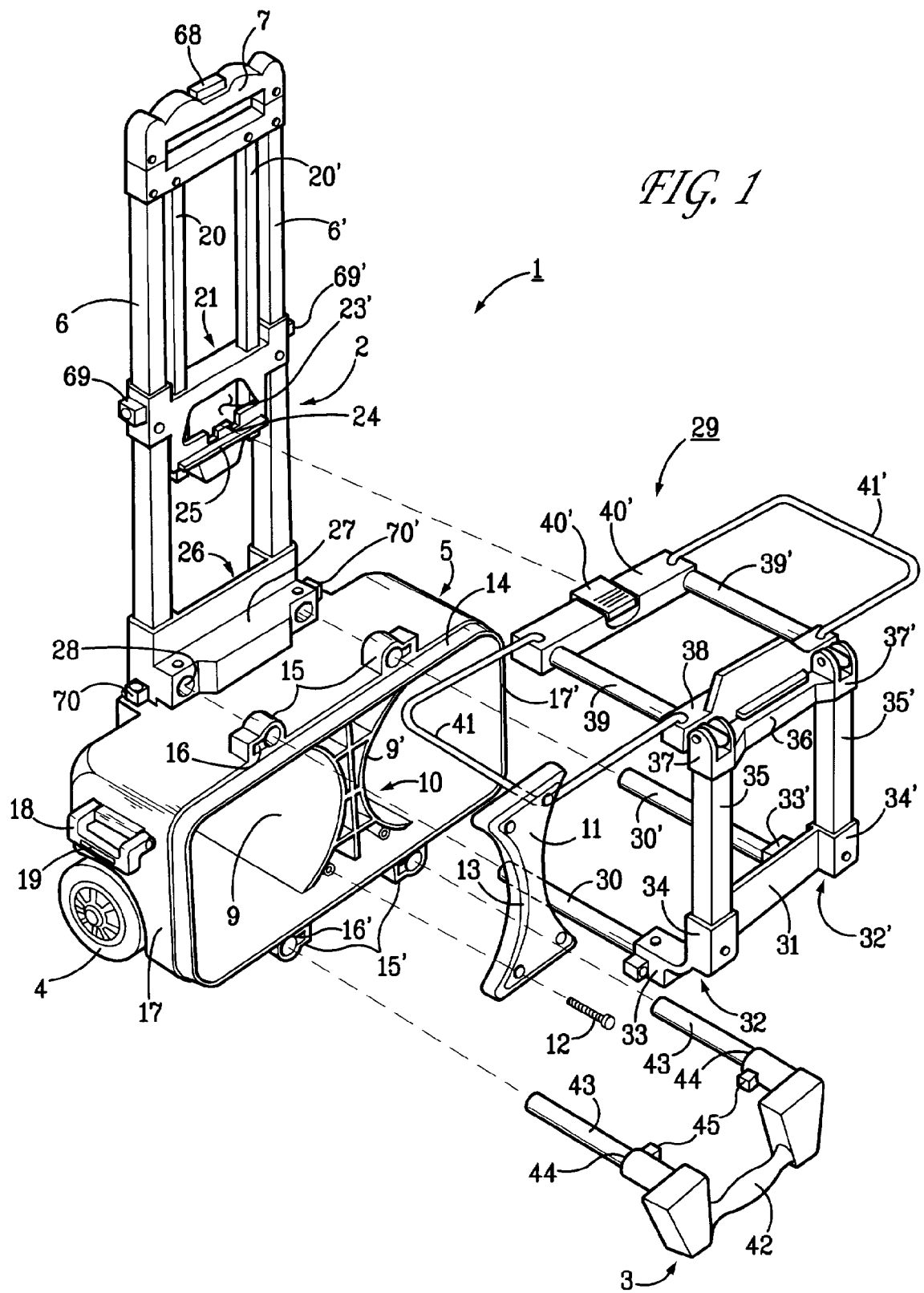
FIG. 1 is an exploded perspective view of a bowling ball carrier in accordance with the primary embodiment of the present invention, the carrier being provided with a integrated synthetic resin bag lying on its side, thus allowing a user to receive or remove bowling balls into or from the bag at the front of said bag.
Figure 2:
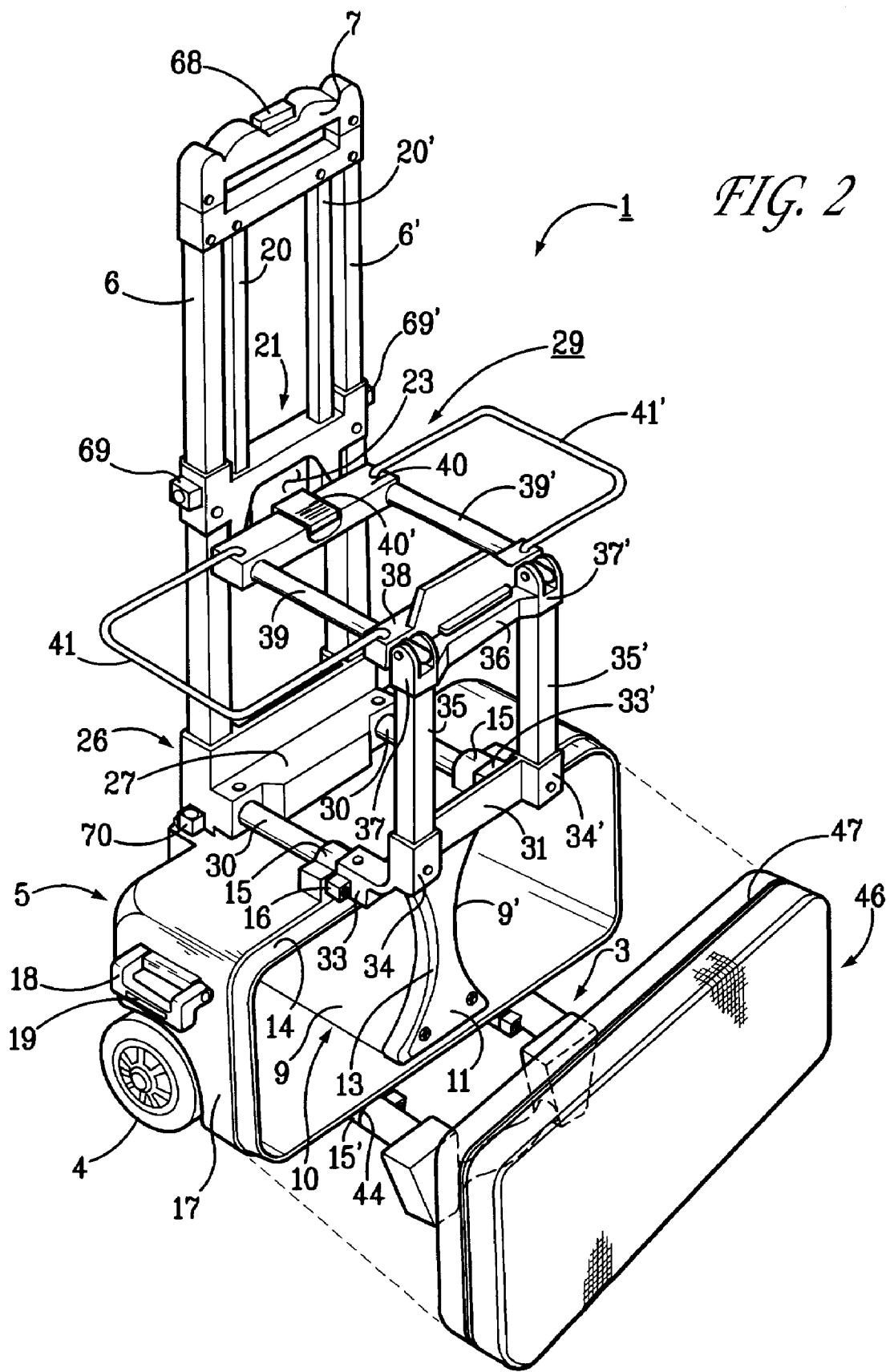
FIG. 2 is a perspective view of the assembled bowling ball carrier having a woven fabric lid at the front opening of the wheeled integrated bag in accordance with a first modification of the primary embodiment of this invention.
Figure 3:
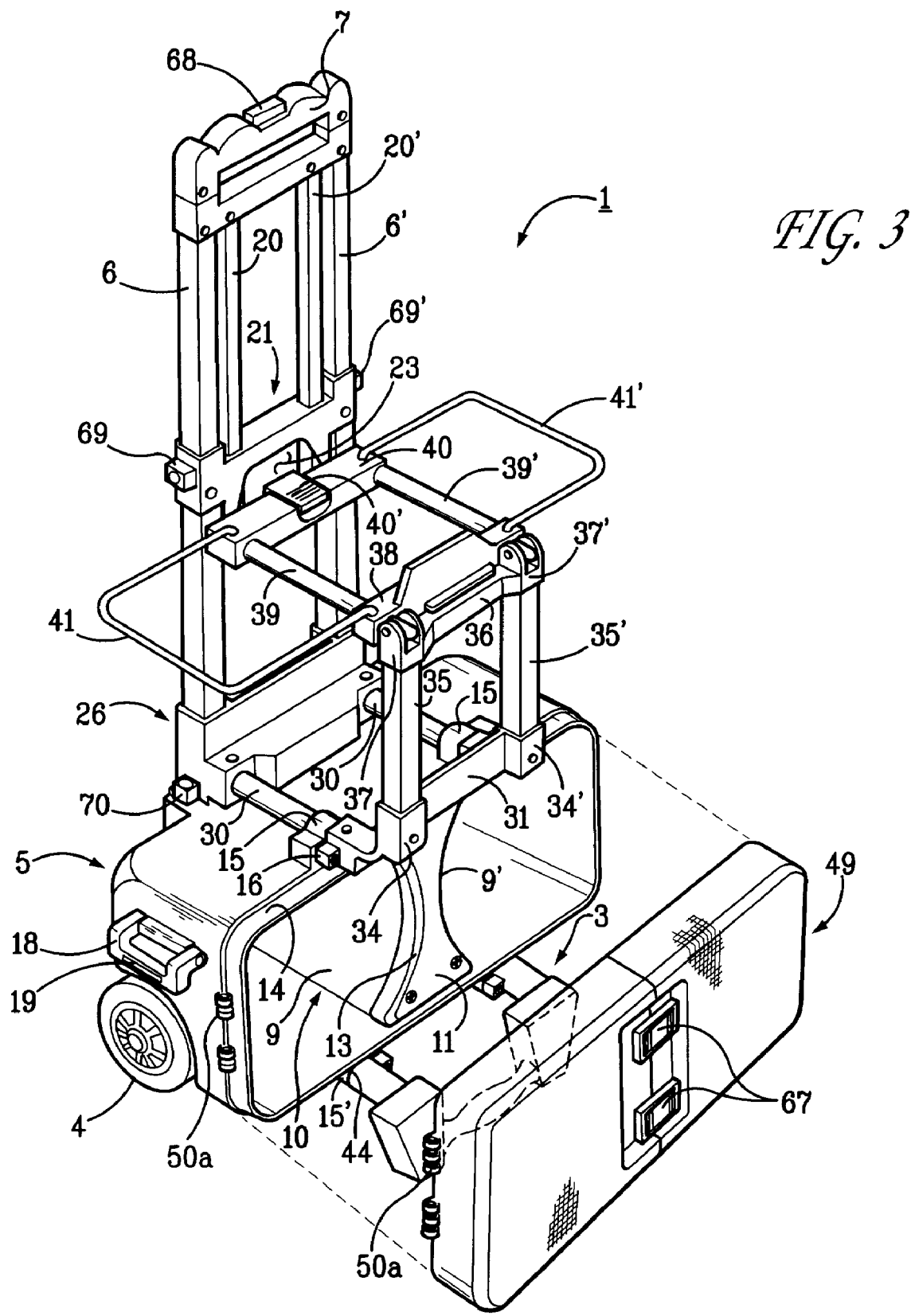
FIG. 3 is a perspective view of the assembled bowling ball carrier having a synthetic resin lid at the front opening of the wheeled integrated bag in accordance with a second modification of the primary embodiment of this invention.
Figure 4:
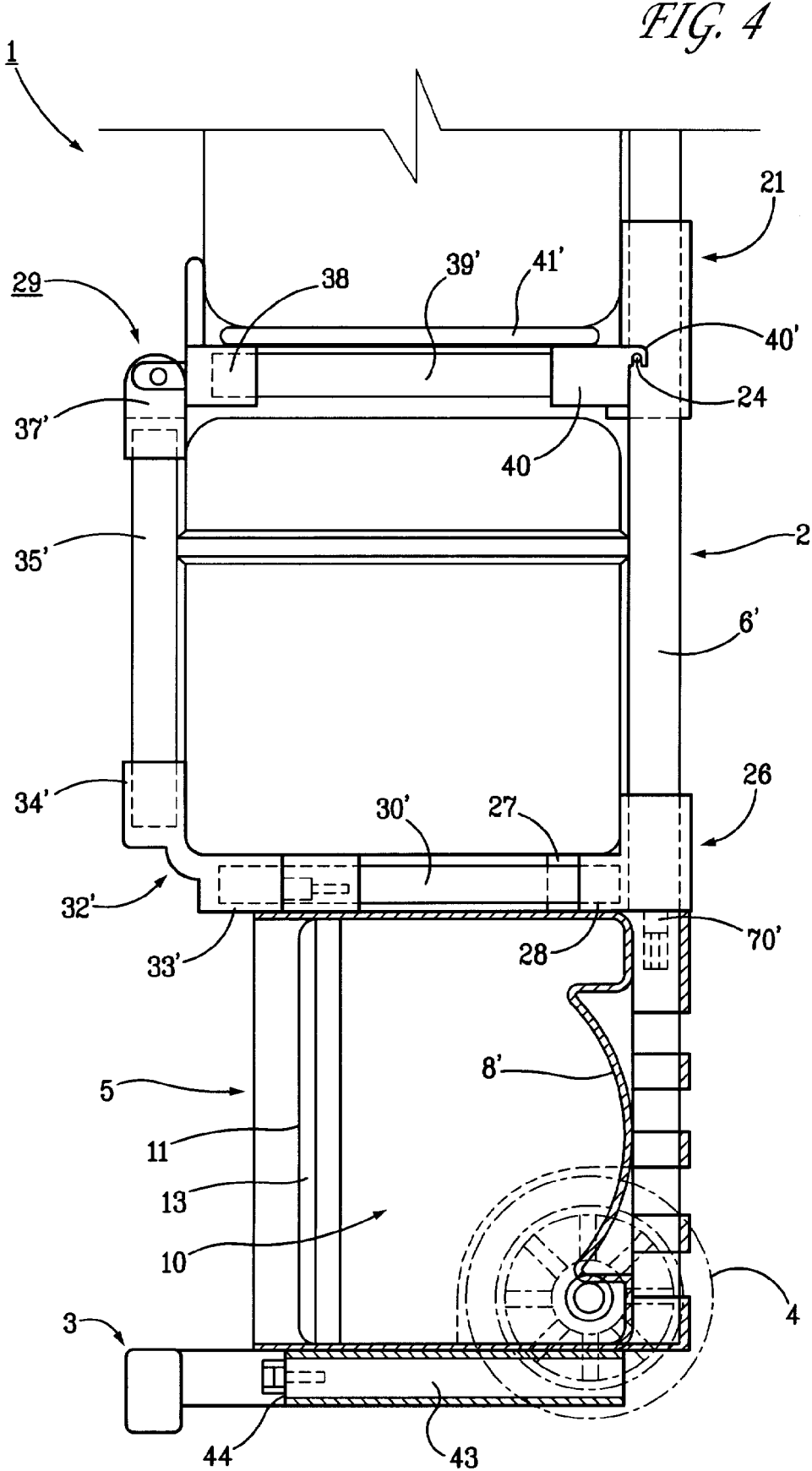
FIG. 4 is a side view of the assembled bowling ball carrier according to the primary embodiment of this invention, with the wheeled integrated bag being shown in a sectional view.
Figure 5:
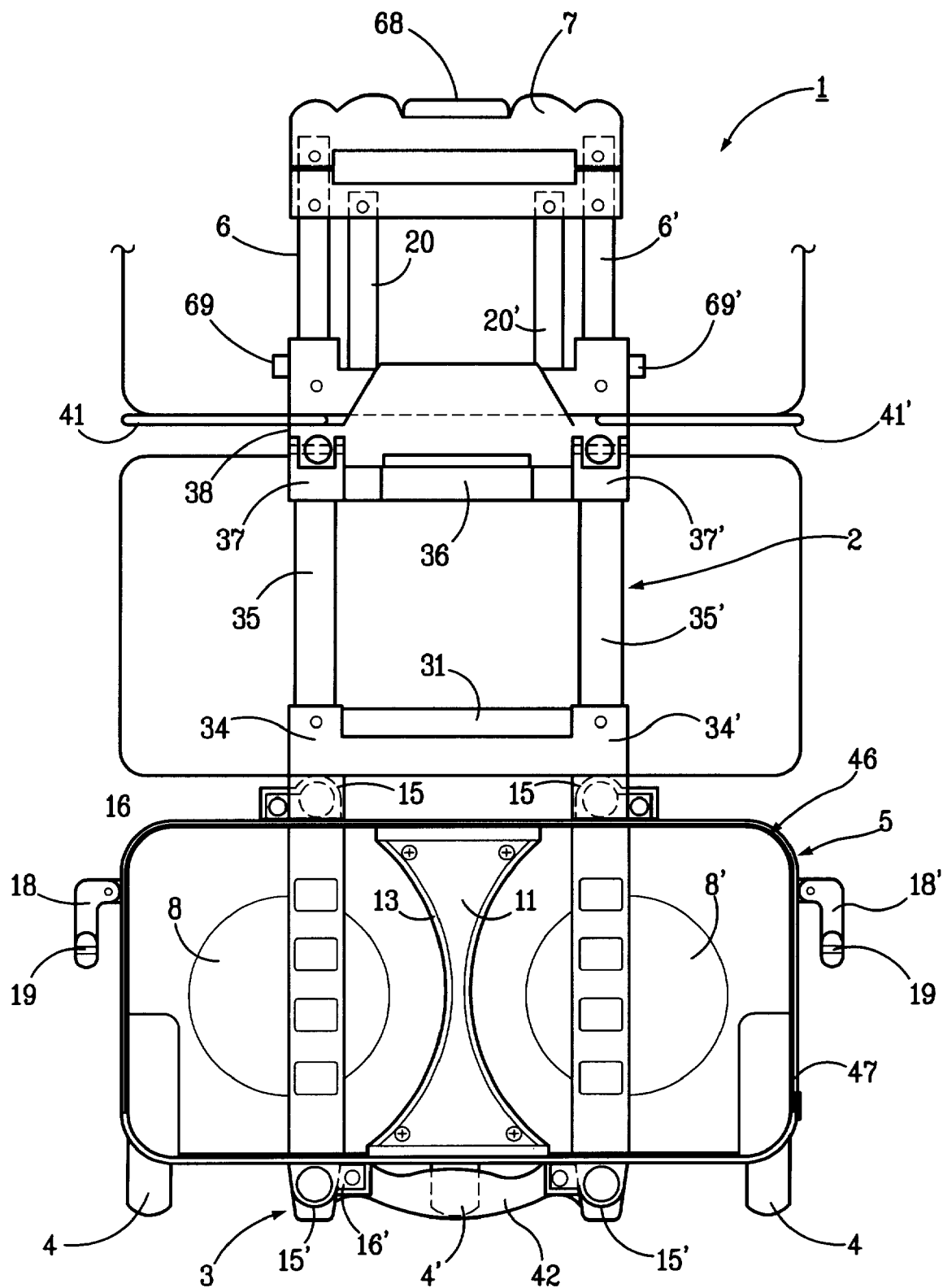
FIG. 5 is a front view of the bowling ball carrier of FIG. 2.
Figure 6:
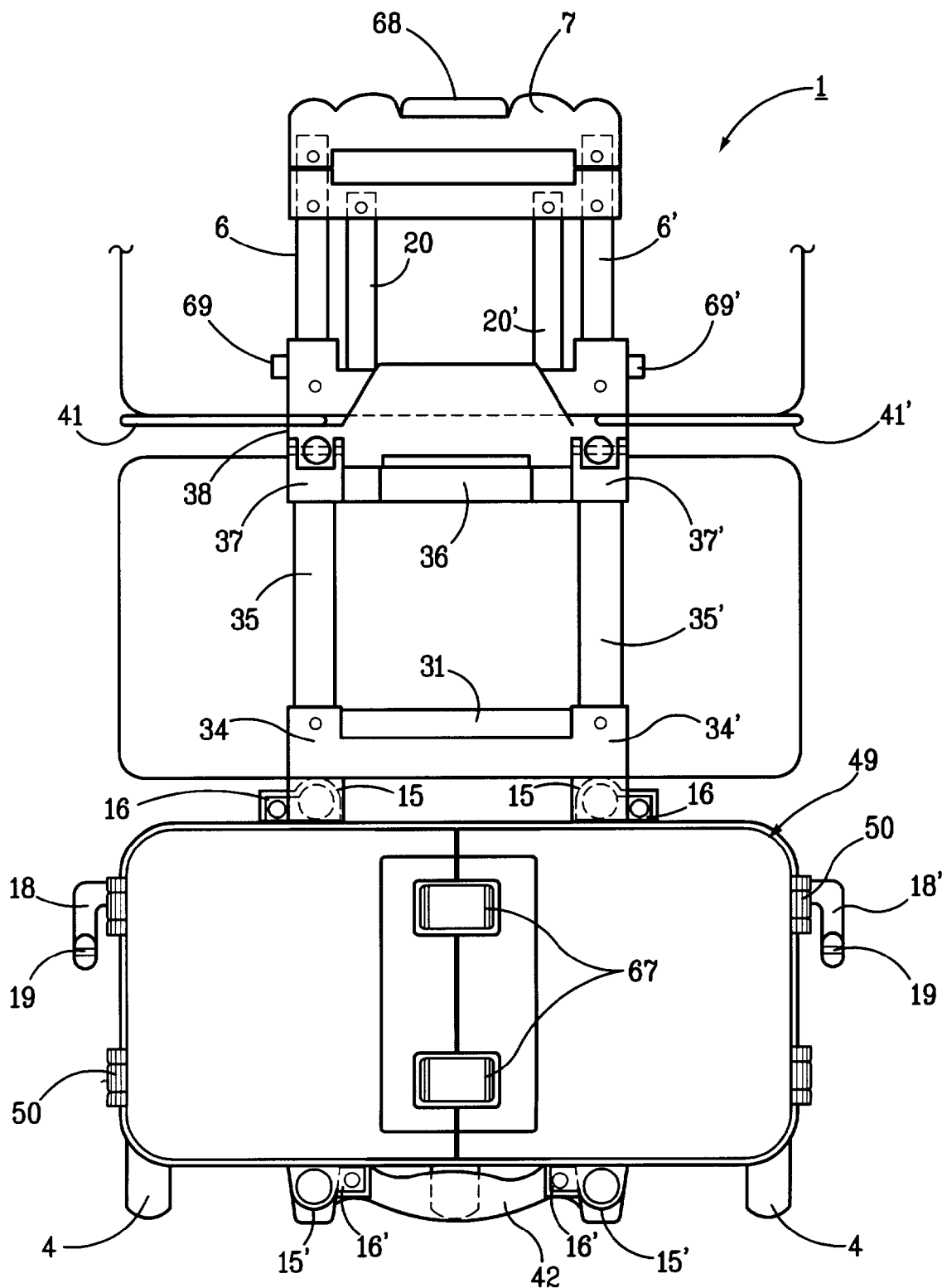
FIG. 6 is a front view of the bowling ball carrier of FIG. 3.
Figure 7:
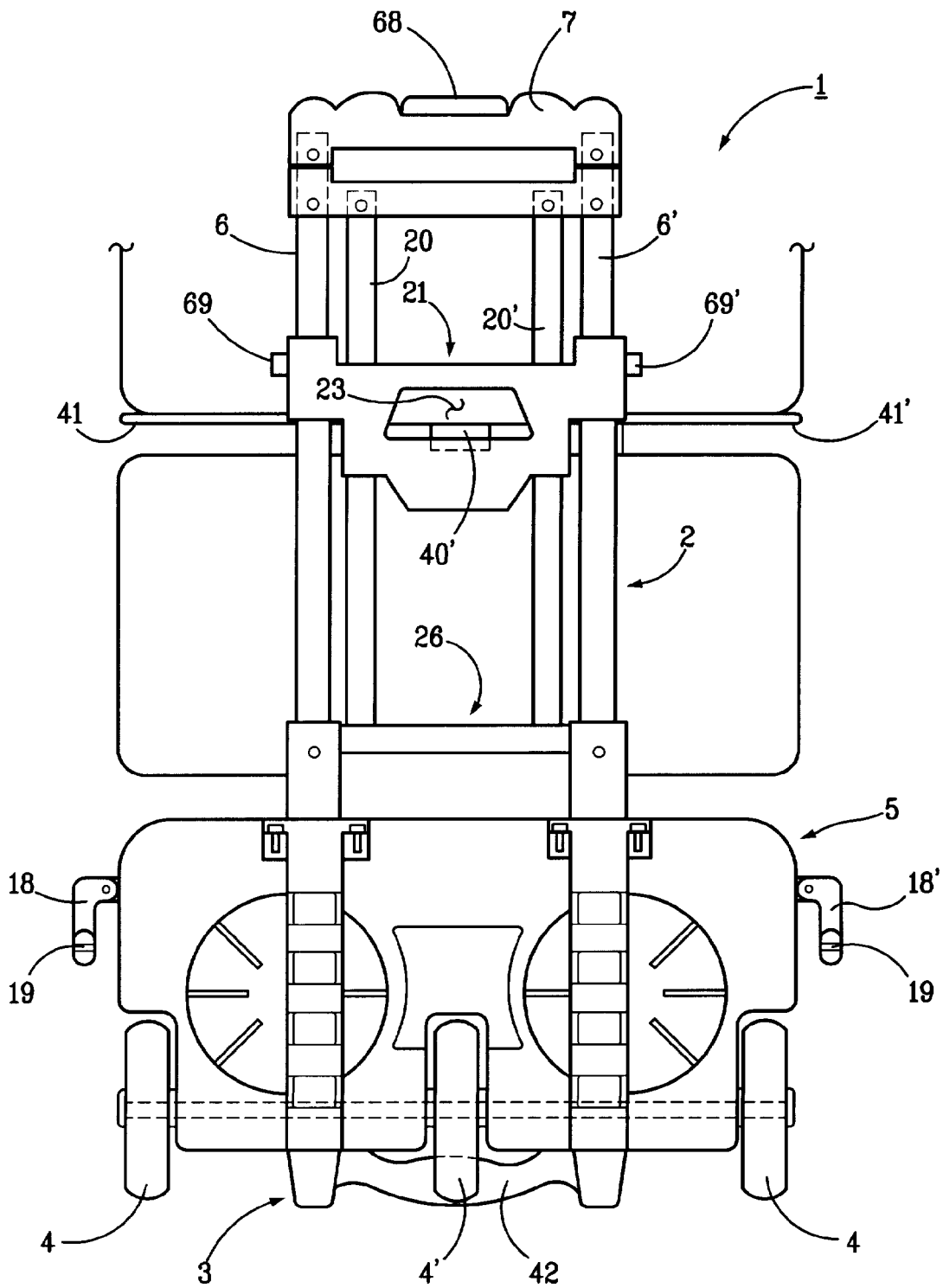
FIG. 7 is a rear view of the bowling ball carrier of FIG. 2 or 3.

FIG. 1 is an exploded perspective view of a bowling ball carrier provided with an integrated synthetic resin bag in accordance with the primary embodiment of this invention. FIG. 2 is a perspective view of the assembled bowling ball carrier of FIG. 1, showing a woven fabric lid attached to the front opening of the wheeled integrated bag in accordance with a first modification of the primary embodiment. FIG. 3 is a perspective view of the assembled bowling ball carrier of FIG. 1, showing a synthetic resin lid attached to the front opening of the wheeled integrated bag in accordance with a second modification of the primary embodiment. FIG. 4 is a side view of the assembled bowling ball carrier of FIG. 1. FIG. 5 is a front view of the bowling ball carrier of FIG. 2. FIG. 6 is a front view of the bowling ball carrier of FIG. 3. FIG. 7 is a rear view of the bowling ball carrier of FIG. 2 or 3.

As shown in the drawings, the bowling ball carrier 1 according to the primary embodiment of this invention comprises a carrier part 2 integrated with a wheeled hard bag 5 at its lower portion. The carrier part 2 comprises a handle frame having a telescopic structure capable of allowing the length of the handle frame to be adjustable. The handle frame comprises two telescopic, parallel columns or main columns 6 and 6', with a horizontally extending main handle 7 being fixed to the top ends of the two main columns 6 and 6' at both ends thereof. The wheeled hard bag 5, made of a synthetic resin material, is integrated with the lower portions of the telescopic handle frame, so that the bag 5 may be a so-called "wheeled integrated bag". In the primary embodiment, the integrated bag 5 lies on its side, thus allowing a user to receive or remove bowling balls into or from the bag 5 at the front of said bag 5. The above bag 5 has two wheels 4 at its rear bottom corners. A bottom support frame 3 detachably engages with the bottom of the bag 5, thus supporting the bottom of the bag 5.

The wheeled integrated bag 5 is opened at its front, thus having a front opening. The above bag 5 also has two ball seats 8 and 8' on its rear inside wall. The two ball seats 8 and 8', having the same size and configuration, are arranged on the left and right sides of the rear inside wall of said bag 5.

A specifically designed partition block 10, having two linearly concaved surfaces 9 and 9' at left and right sides thereof, is integrally set in the central portion of the interior of said integrated bag 5, thus partitioning the interior of the bag 5 into two cavities individually having one ball seat 8, 8'. A block cover 11, having the same profile as that of the partition block 10, is attached to the front end of the block 10 by a plurality of set screws 12, thus covering the front end of said block 10 and giving a suitable and smooth appearance to the front end of the block 10. The outside edge 13 of the front surface of said block cover 11 is smoothly chamfered.

Two top bosses 15 are formed on the top side of the front edge 14 of said integrated bag 5 at two spaced positions. The two top bosses 15 individually have a screw hole 16 in a way such that two screw holes 16 of the two bosses 15 are remote from each other. In the same manner, two bottom bosses 15' are formed on the bottom side of the front edge 14 of said integrated bag 5 at two spaced positions. The two bottom bosses 15' individually have a screw hole 16' in a way such that two screw holes 16' of the two bottom bosses 15' are close to each other.

Two hinged handles 18 and 18' are respectively and exteriorly attached to both sidewalls 17 and 17' of the integrated bag 5 at positions above the wheels 4. Each of the two hinged handles 18 and 18' has a belt slit 19 allowing a fastening belt (not shown) to pass through. The above fastening belt is used for fastening an uppermost bag to the carrier 1.

A reinforcing column 20, 20' extends inside each of the telescopic columns 6 and 6' while being parallel to said telescopic columns 6 and 6'. The top ends of the two reinforcing columns 20 and 20' are fixed to the handle 7 using set screws, while the lower ends of said reinforcing columns 20 and 20' perpendicularly pass through a locking beam 21 which horizontally extends between the middle portions of the two telescopic columns 6 and 6'. In such a case, the two telescopic columns 6 and 6' also perpendicularly pass through both ends of said locking beam 21. The above locking beam 21 has a release opening 23, a locking projection 24 and a support flange 25. A lower support beam 26 horizontally extends between the lower portions of the two telescopic columns 6 and 6' and is seated on the rear edge of the top wall of said integrated bag 5. In such a case, the two telescopic columns 6 and 6' perpendicularly pass through both ends of said lower support beam 26. The lower support beam 26 has a step holder 27 at its front surface, with two fixing holes 28 being transversely formed on both ends of said step holder 27 in a way such that the two fixing holes 28 are respectively aligned with the holes of the two top bosses 15.

Both end walls of the locking beam 21 individually have one bracket projection 69, 69' which has an interiorly-threaded horizontal hole directed to an associated telescopic column 6, 6'. The locking beam 21 is thus fixed to the two telescopic columns 6 and 6' by set screws passing through the horizontal holes of the two bracket projections 69 and 69'. In the same manner, both end walls of the lower support beam 26 individually have one bracket projection 70, 70' which has an interiorly-threaded vertical hole directed to the top wall of the integrated bag 5. The lower support beam 26 is thus fixed to the top wall of the integrated bag 5 by set screws passing through the vertical holes of the two bracket projections 70 and 70'.

An upper bag holder frame 29, used for holding one or two detachable bags on the carrier 1, is attached to the lower support beam 26 at a position above the integrated bag 5. The carrier 1 thus effectively holds two or more bowling ball bags at the same time. The upper bag holder frame 29 has a lower part which comprises two lower parallel pipes 30 and 30'. The two pipes 30 and 30' respectively pass through the two top bosses 15 of the integrated bag 5 prior to being inserted into and fixed to the two fixing holes 28 of the lower support beam 26. The two lower pipes 30 and 30' are also perpendicularly fixed to both ends of a connection beam 31. Both ends of the connection beam 31 individually have a connector 32, 32' comprising two pipe fitting parts: a lower fitting part 33, 33' and an upper fitting part 34, 34'. A bracket projection, having an interiorly-threaded hole, is formed on the outside wall of each lower fitting part 33 and 33'. In the connection beam 31, each connector 32, 32' acts as a conventional elbow. That is, the two lower pipes 30 and 30' are respectively inserted into and fixed to said two lower fitting parts 33 and 33'. In addition, two support columns 35 and 35' are respectively fitted into the two upper fitting parts 34 and 34' of the connection beam 31 at their lower ends, thus vertically extending in parallel to each other. Due to the connectors 32 and 32', the lower pipes 30 meet the support columns 35 and 35' at right angles. The two support columns 35 and 35' are also respectively fixed to opposite fitting parts 37 and 37' of a hinge beam 36 at their top ends.

The two fitting parts 37 and 37' of the hinge beam 36 individually have a hinge at its top surface. A longitudinal mount 38 is rotatably mounted to the two hinges of said hinge beam 36. A longitudinal locking member 40 is coupled to the rotatable mount 38 through two parallel connection pipes 39 and 39' in a way such that the locking member 40 is positioned in parallel to the rotatable mount 38. The locking member 40 has a locking hook 40' at the central portion thereof. A curved support wire 41, 41', having a U-shaped configuration, extends from each end of the rotatable mount 38 to an associated end of the locking member 40 in a way such that two curved support wires 41 and 41' enlarge the support area of the frame 29 for an uppermost bag. The locking hook 40' of the locking member 40 selectively engages with the locking projection 24, formed on the edge of the release opening 23 of the locking beam 21. The locking member 40 thus selectively holds the upper part of said upper bag holder frame 29 to the locking beam 21.

The bottom support frame 3, detachably engaging with the two bottom bosses 15' of the integrated bag 5 at the front of said bag 5, comprises a fixed handle 42 integrated with two parallel insert pipes 43. The two parallel insert pipes 43 perpendicularly extend from both ends of the handle 42 to a length capable of allowing the pipes 43 to be fully inserted into the bottom bosses 15' of the bag 5. The above insert pipes 43 are individually stepped at a position around their inside ends, thus having a step 44. Due to the step 44, each insert pipe 43 has a small-diameter part and a large-diameter part. Two bracket projections 45 are formed on the large-diameter parts of the two insert pipes 43 at positions around the steps 44 in a way such that the two projections 45 are directed to each other.

In accordance with a first modification of the primary embodiment, a woven fabric lid 46, having a rectangular configuration, is attached to the front opening of the wheeled integrated bag 5 as shown in FIG. 2. In such a case, the outside edge of the fabric lid 46 is sewn to the front edge 14 of the integrated bag 5. A fastener 47 is attached along the outside surface of the lid 46, thus selectively opening the lid 46 when it is necessary to receive or remove bowling balls 48 (see FIGS. 9 and 10) into or from the bag 5 at the front of said bag 5.

In accordance with a second modification of the primary embodiment, a synthetic resin lid 49, comprising two separate parts and made of the same material as that of the integrated bag 5, is attached to the front opening of said bag 5 as shown in FIG. 3. In such a case, the two parts of said synthetic resin lid 49 are individually hinged to a side portion of the front edge 14 of said integrated bag 5 using two hinged joints 50a, so that the two parts of the lid 49 are openable at the front of the bag 5 when necessary. Therefore, the above lid 49 allows a user to receive or remove bowling balls 48 into or from the bag 5 at the front of said bag 5.

Figure 8:
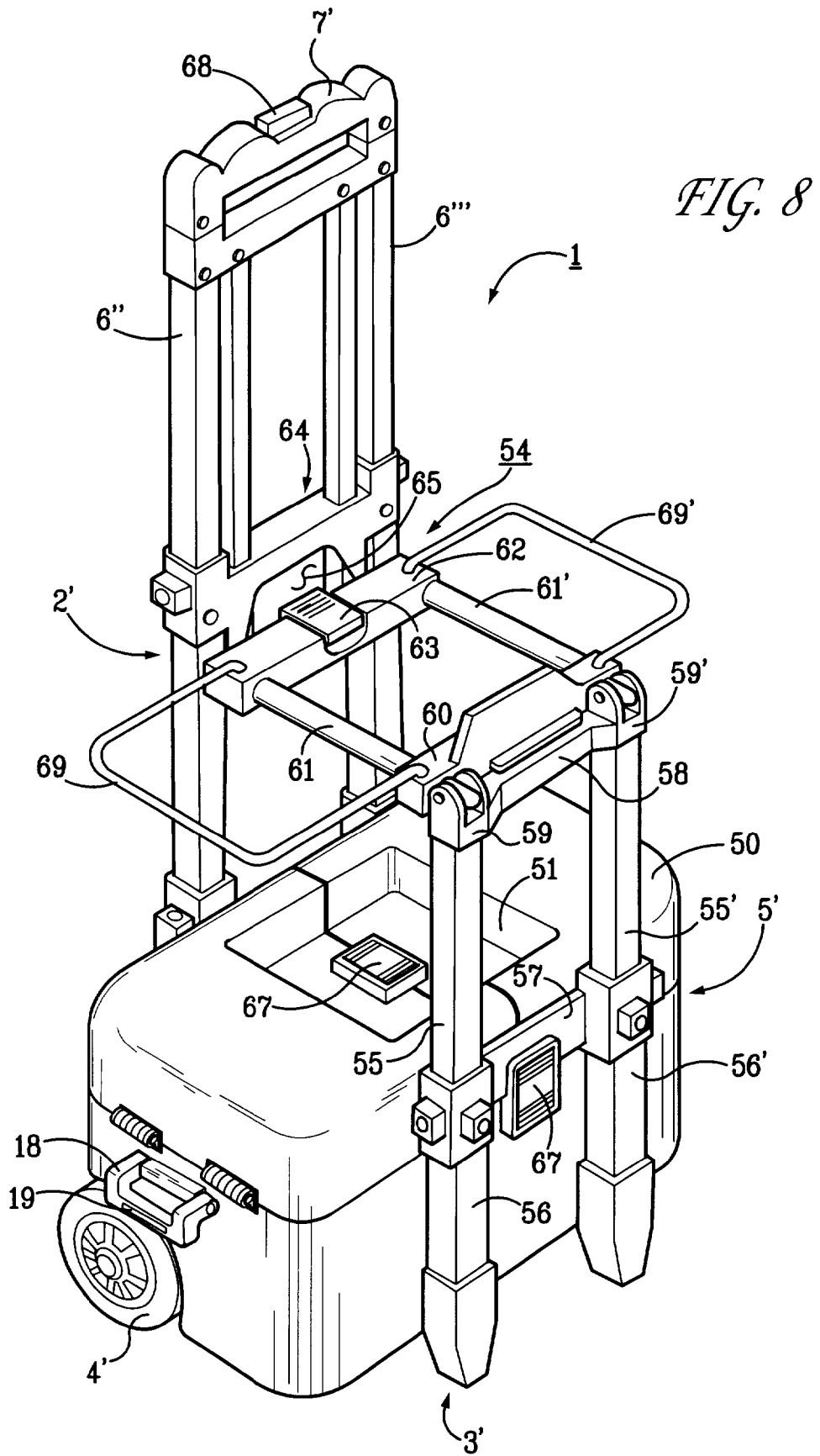
FIG. 8 is a perspective view showing a bowling ball carrier in accordance with the second embodiment of this invention, the carrier being provided with a wheeled integrated bag standing on its bottom, thus allowing a user to receive or remove bowling balls into or from the bag at the top of said bag.
Figure 9:
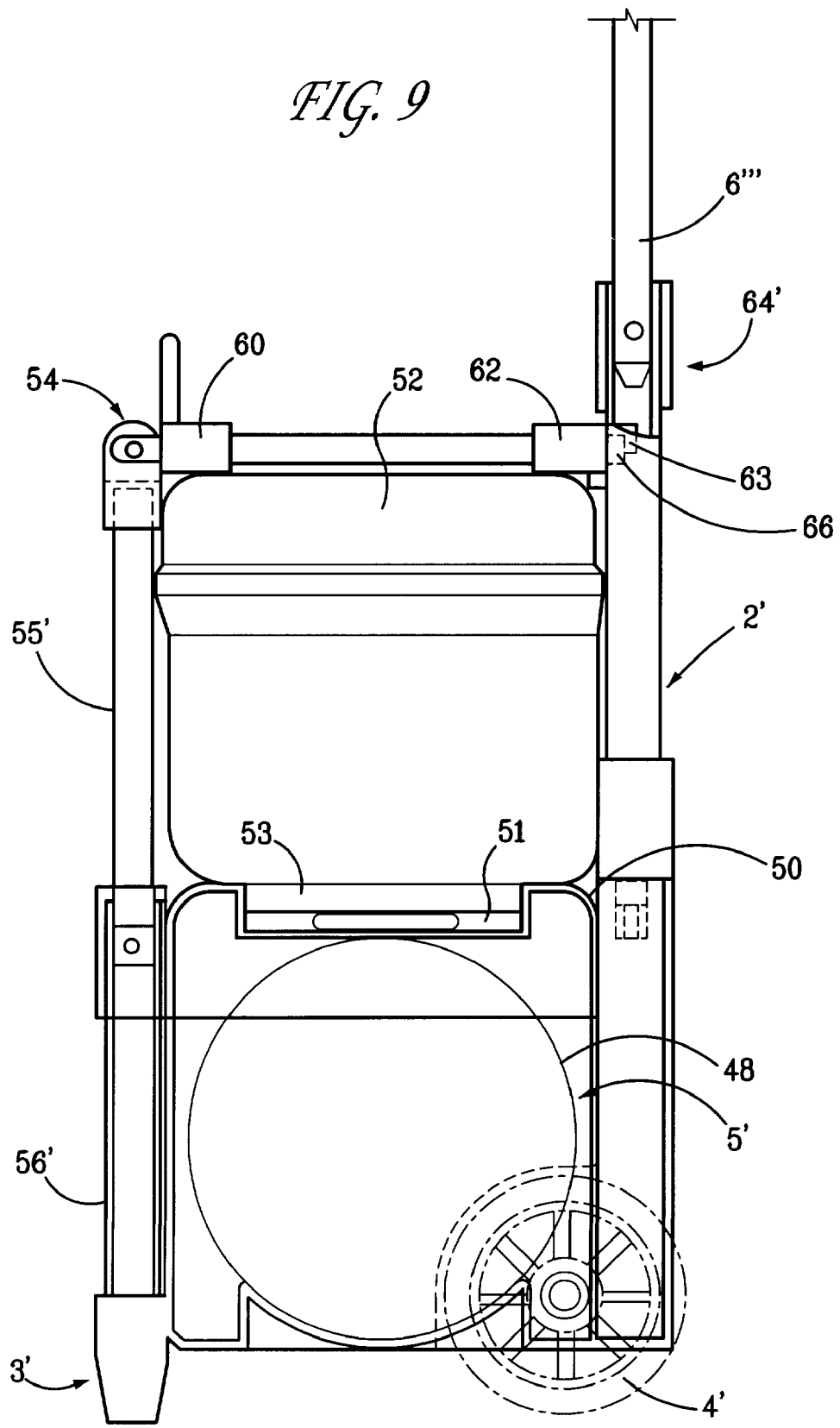
FIG. 9 is a side view of the bowling ball carrier of FIG. 8.
Figure 10:
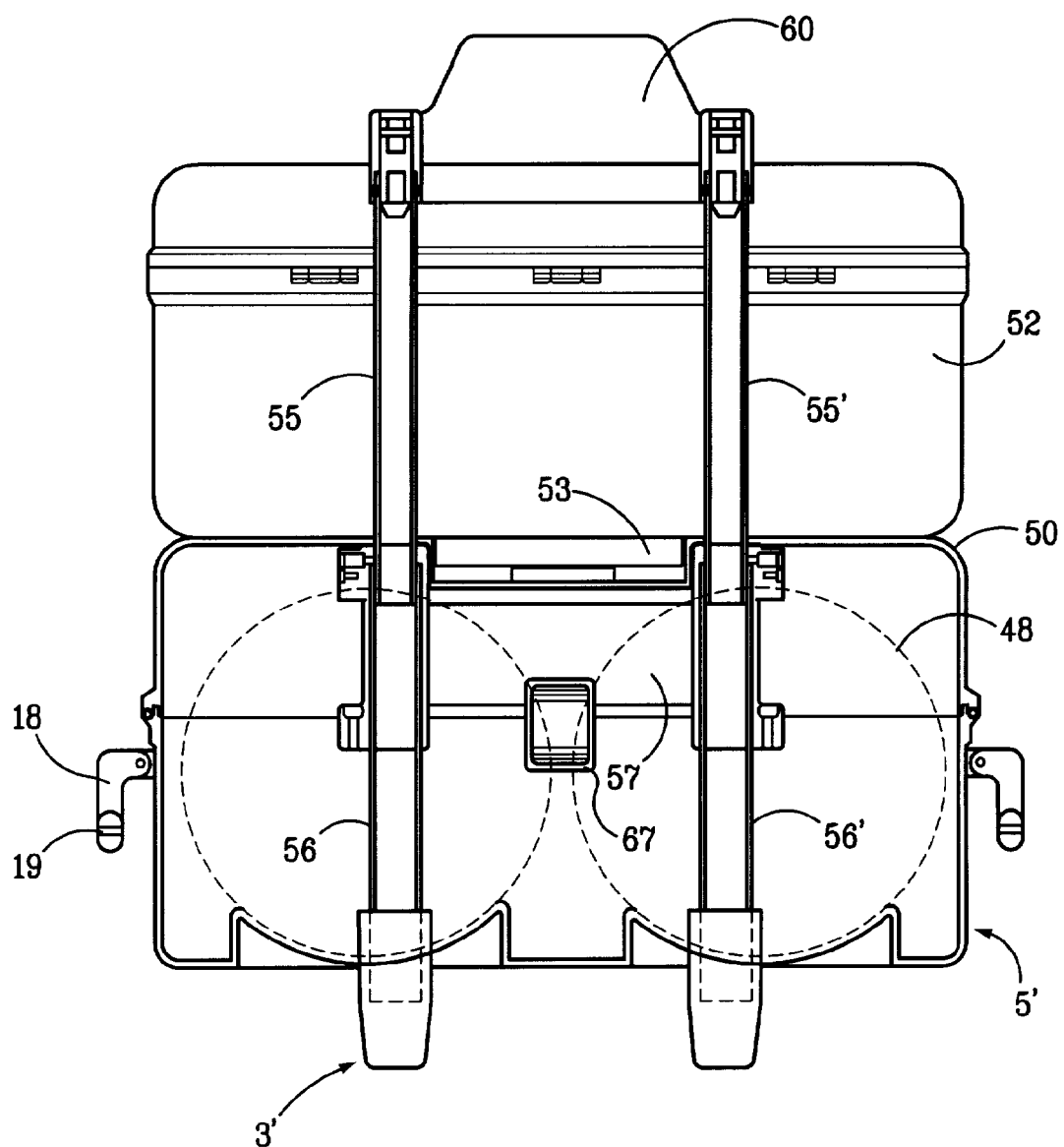
FIG. 10 is a front view of the bowling ball carrier of FIG. 8, with the retractable part of a telescopic handle frame being removed from the carrier.

FIG. 8 is a perspective view showing a bowling ball carrier in accordance with the second embodiment of this invention. FIG. 9 is a side view of the bowling ball carrier of FIG. 8. FIG. 10 is a front view of the bowling ball carrier of FIG. 8, with a retractable part of the telescopic handle frame being removed from the carrier.

As shown in the drawings, the bowling ball carrier 1' according to the second embodiment of this invention comprises a carrier part 2' integrated with a wheeled bag 5' at its lower portion. The carrier part 2' comprises a handle frame having a telescopic structure capable of allowing the length of the handle frame to be adjustable. The handle frame comprises two telescopic, parallel columns 6" and 6'", with a horizontally extending main handle 7' being fixed to the top ends of the two telescopic columns 6" and 6'" at both ends thereof. The wheeled bag 5', made of a synthetic resin material, is integrated with the lower portions of the telescopic handle frame, so that the bag 5' may be a so-called "wheeled integrated bag". In the second embodiment, the wheeled integrated bag 5' stands on its bottom, thus allowing a user to receive or remove bowling balls 48 into or from the bag 5' at the top of said bag 5'. The above bag 5' has two wheels 4' at its rear bottom corners. The bag 5' also has two fixed column holders 3' at two spaced positions along the front edge of the bottom. The top opening of the integrated bag 5' is covered with an openable lid 50, which comprises two separate parts made of a synthetic resin material and is hinged to both sidewalls of the bag 5'. A rectangular depression 51 is formed on the central portion of the top surface of said lid 50. When another bag 52, having a protruded bottom 53, is held on the top of the integrated bag 5' while standing on its bottom, the depression 51 of the lid 50 receives the protruded bottom 53 of the upper bag 52 as shown in FIGS. 9 and 10, thus allowing the upper bag 52 to be stably seated on the top of the integrated bag 5'.

The carrier 1' of the second embodiment also has an upper bag holder frame 54, used for holding one or two detachable bags 52 on the carrier 1'. The upper bag holder frame 54 comprises two fixed support columns 56 and 56' which are fixedly held by the two column holders 3' of the bag 5'. The two support columns 56 and 56' are also perpendicularly fixed to both ends of a connection beam 57 at their upper ends. Two retractable columns 55 and 55' are slidably inserted into the upper ends of the support columns 56 and 56' respectively through both ends of the connection beam 57, thus forming a telescopic column structure. The two retractable columns 55 and 55' are also respectively fixed to both fitting parts 59 and 59' of a hinge beam 58 at their top ends. The two fitting parts 59 and 59' of the hinge beam 58 individually have a hinge at its top surface. A longitudinal mount 60 is rotatably mounted to the two hinges of the hinge beam 58. A longitudinal locking member 62 is coupled to the rotatable mount 60 through two parallel connection pipes 61 and 61' in a way such that the locking member 62 is positioned in parallel to the rotatable mount 60. The locking member 62 has a locking hook 63 at the central portion thereof. A curved support wire 69, 69', having a U-shaped configuration, extends from each end of the rotatable mount 60 to an associated end of the locking member 62 in a way such that two curved support wires 69 and 69' enlarge the support area of the frame 54 for an uppermost bag. The locking hook 63 of the locking member 62 selectively engages with a bracket projection 66, formed on the edge of a release opening 65 of a locking beam 64. In such a case, the locking beam 64 horizontally extends between the middle portions of the two telescopic columns 6" and 6'" of the handle frame in the same manner as that described for the primary embodiment. The locking member 62 thus selectively holds the upper part of said upper bag holder frame 54 to the locking beam 64.

In the drawings, FIGS. 1 to 10, the reference numeral 67 denotes a locking means provided at the junction between the two separate parts of the synthetic resin lid 49, 50 of the wheeled bag 5, 5' for allowing a user to selectively open the lid 49, 50. The numeral 68 denotes a push button provided on the handle 7, 7' of the handle frame for allowing a user to select the position of the telescopic handle frame, comprising the columns 6, 6', 6", 6'" and the reinforcing columns 20, 20', 20", 20'", between a fixed position and an adjustable position.

The carrier 1, 1' of this invention will be assembled as follows.

In the case of the carrier 1 of the primary embodiment, the block cover 11 is attached to the front end of the partition block 10, integrally formed in the interior of the synthetic resin bag 5, by a plurality of set screws 12. Thereafter, a woven fabric lid 46 may be attached to the front opening of the bag 5 by sewing the outside edge of said fabric lid 46 to the front edge 14 of the bag 5. Alternatively, a synthetic resin lid 49, comprising two separate parts, may be attached to the front opening of said bag 5 by hinging the two parts of the lid 49 to the front edge 14 of said bag 5 using the hinged joints 50a.

Thereafter, the bottom support frame 3 is attached to the two bottom bosses 15' of the integrated bag 5 at the front of said bag 5. That is, the two parallel insert pipes 43 of the frame 3 are fully inserted into the bottom bosses 15' of the bag 5 until the steps 44 of the pipes 43 are brought into close contact with the bottom bosses 15'. Thereafter, the frame 3 is firmly fixed to the two bottom bosses 15' using two set screws. In such a case, the two set screws respectively pass through the screw holes of the bracket projections 45 prior to being threaded into the screw holes 16' of said two bottom bosses 15'.

After attaching the bottom support frame 3 to the integrated bag 5, the upper bag holder frame 29 is attached to the carrier part 2. That is, the two lower parallel pipes 30 and 30' of the frame 29 respectively pass through the two top bosses 15 of the integrated bag 5 prior to being inserted into the two fixing holes 28 of the lower support beam 26. Thereafter, the frame 29 is firmly fixed to the two top bosses 15 using two set screws. In such a case, the two set screws respectively pass through the screw holes of the bracket projections, formed on the outside walls of the two lower fitting parts 33, 33' of the connection beam 31, prior to being threaded into the screw holes 16 of said two top bosses 15.

When it is necessary to receive or remove bowling balls 48 into or from the integrated bag 5 having a woven fabric lid 46, the lid 46 is opened by the fastener 47 attached along the external surface of the lid 46. After opening the lid 46, two bowling balls 48 may be received into the two partitioned cavities of the bag 5 while being seated on the two ball seats 8 and 8'. On the other hand, in the case of the integrated bag 5 having a synthetic resin lid 49, the locking means 67, provided at the junction between the two separate parts of the lid 49, has to be unlocked prior to opening the two separate parts of the lid 49. After opening the lid 49, two bowling balls 48 may be received into the two partitioned cavities of the bag 5 while being seated on the two ball seats 8 and 8'. In the carrier 1 according to the primary embodiment, the wheeled integrated bag 5 or the lowest bag of the carrier 1 lies on its side, thus allowing a user to receive or remove bowling balls 48 into or from the bag 5 at the front of said bag 5. Therefore, this carrier 1 is convenient to a user while receiving or removing bowling balls 48 into or from the bag 5 since the bag 5 does not force the user to remove upper bags prior to opening the bag 5.

Since the block cover 11, attached to the front end of the partition block 10, is smoothly chamfered at its outside edge 13, the bowling balls 48 are free from being damaged by the block 10 when they are inserted into the bag 5.

When it is necessary to hold another bag above the integrated bag 5, the locking hook 40', provided on the locking member 40 of the upper bag holder frame 29, is primarily removed from the locking projection 24 of the locking beam 21.

Thereafter, the upper part of the frame 29 is rotated clockwise in FIGS. 1 to 4 around the hinged joints between the rotatable mount 38 and the hinge beam 36, thus being opened. After opening the upper part of the frame 29, another bag or an upper bag is seated on the lower part of the frame 29. In such a case, the bottom of the upper bag is stably seated on both the step holder 27 of the lower support beam 26 and the two lower fitting parts 33 and 33' of the connection beam 31. After seating the upper bag on the lower part of the frame 29, the upper part of the frame 29 is rotated counterclockwise around the hinged joints until both the locking member 40 and the two parallel connection pipes 39 and 39' of the frame 29 are brought into contact with the top of the upper bag. Thereafter, the locking hook 40' of the locking member 40 engages with the locking projection 24 of the locking beam 21. In such a case, the bottom surface of the locking member 40 is firmly supported by the support flange 25 of the locking beam 21. The upper bag is thus stably held on the carrier 1 by the upper bag holder frame 29.

The above carrier 1 also allows a user to hold a third bag on the upper part of the upper bag holder frame 29. When it is necessary to hold a third bag on the carrier 1, the third bag or an uppermost bag is seated on the upper part of the frame 29 prior to being fastened by a fastening belt (not shown). In such a case, the bottom of the uppermost bag is stably supported by the two curved support wires 41 and 41' provided on the upper part of the frame 29. The above fastening belt for the uppermost bag is coupled to the belt slits 19 of the two handles 18 and 18' provided on the integrated bag 5.

In the case of the carrier 1' of the second embodiment, the wheeled integrated bag 5' stands on its bottom, thus allowing a user to receive or remove bowling balls 48 into or from the bag 5' at the top of said bag 5'. An openable lid 50, comprising two separate parts made of a synthetic resin material, is hinged to both sidewalls of the integrated bag 5', thus closing the top opening of the bag 5'. The top surface of said lid 50 has a rectangular depression 51 at the central portion. When another bag 52 or an upper bag, having a protruded bottom 53, is seated on the top of the integrated bag 5' while standing on its bottom, the depression 51 of the lid 50 receives the protruded bottom 53 of the upper bag 52. Therefore, the upper bag 52 is stably seated on the top of the integrated bag 5'. After seating the upper bag 52 on the top of the wheeled integrated bag 5', the upper bag 52 is held in its place by the upper bag holder frame 54. In the upper bag holder frame 54, the two retractable columns 55 and 55' are respectively and slidably inserted into the upper ends of the support columns 56 and 56' provided on the front wall of the integrated bag 5', thus forming a telescopic column structure.

In the same manner as that described for the primary embodiment, the carrier 1' according to the second embodiment allows a user to hold a third bag on the upper part of the upper bag holder frame 54. In such a case, the third bag or the uppermost bag is fastened to the carrier 1' by a fastening belt (not shown). The above fastening belt for the uppermost bag is coupled to the belt slits 19 of the two handles 18 and 18' provided on the integrated bag 5'.

In the bowling ball carrier 1, 1' of this invention, the reinforcing columns 20, 20', 20", 20"', extending inside the columns 6, 6', 6", 6"' while being parallel to each other, are for reinforcing the telescopic column structure of the carrier part 2, 2' when three bags are held on the carrier part 2, 2' at the same time. That is, due to the reinforcing columns 20, 20', 20", 20"', the main columns 6, 6', 6", 6"' are not undesirably bent or distorted even when the columns 6, 6', 6", 6"' are loaded with three heavy bags.

As described above, the present invention provides a bowling ball carrier, which is integrated with a wheeled bag at its lower portion and effectively and stably holds one or two bowling ball bags in addition to said wheeled bag without overloading the telescopic column structure of the carrier irrespective of the three heavy bags. The carrier also allows a user to easily and simply receive or remove bowling balls into or from the bags, thus being convenient to users. The telescopic handle frame of the carrier has a strong structure, so that the carrier effectively carries two or three bags at the same time while almost completely preventing the bags from being undesirably deformed or damaged.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A bowling ball carrier comprising:

two parallel and telescopic columns each with a top and bottom end;

a main handle coupled to the top ends of both said telescopic columns;

a wheeled bag including a front, back, top, bottom and two side walls wherein said bottom ends of said telescopic columns are connected with said back wall of said wheeled bag and said front wall of said wheeled bag has a front opening capable of allowing a user to receive or remove bowling balls into or from the wheeled bag at the front of said bag, said wheeled bag comprising:

two ball seats provided on an inside wall of said back wall of said bag in a way such that the two ball seats are arranged on left and right sides of said inside back wall;

a partition block having two linearly concaved surfaces at left and right sides thereof and integrally set in a central portion of the interior of said wheeled bag, thus partitioning the interior of said bag into two cavities respectively having said ball seats, said partition block being covered with a blocking cover at a front surface, and said blocking cover being chamfered along an outside edge of its front surface;

two bosses formed on each of top and bottom front edges of said wheeled bag at two spaced positions, each of said two bosses having a screw receiving hole;

a hinged handle exteriorly attached to each sidewall of the wheeled bag, each said hinged handle having a belt slit for permitting a fastening belt to pass through;

a bottom support frame attached to said bottom wall of said wheeled bag;

a locking beam extending horizontally between middle portions of said two telescopic columns;

a reinforcing column extending inside each of the telescopic columns while being parallel to said telescopic columns, with a top end of said reinforcing column being fixed to the main handle and a lower end of said reinforcing column extending perpendicularly through said locking beam;

a lower support beam horizontally extending between the two telescopic columns at a position under the locking beam; and an upper bag holder frame assembly having first and second support members used for removably holding first and second upper bags, respectively, in addition to the wheeled bag on the carrier, said upper bag holder frame having said first support member secured to the two fixed column holders of the wheeled bag and said second support member selectively attachable in locking engagement with said locking beam of said two telescopic columns.

2. The bowling ball carrier according to claim 1, wherein said locking beam is perpendicularly fitted over the two telescopic columns at both ends thereof and has a release opening, a locking projection and a support flange.

3. The bowling ball carrier according to claim 1 or 2, wherein said lower support beam is perpendicularly fitted over the two telescopic columns at both ends thereof and is seated on a rear edge of a top wall of said wheeled bag, said lower support beam also having a step holder at a front surface, with two fixing holes being transversely formed on both ends of said step holder in a way such that the two fixing holes are respectively aligned with top bosses of said wheeled bag.

4. The bowling ball carrier according to claim 1, wherein said upper bag holder frame comprises:

two lower parallel pipes respectively passing through the two bosses of the wheeled bag prior to being inserted into and fixed to two fixing holes in the lower support beam;

a connection beam connecting the front ends of the two lower parallel pipes;

two support columns having lower ends held by said connection beam in a way such that the support columns meet the two lower parallel pipes at right angles;

a hinge beam holding top ends of said two support columns at both ends of said hinge beam;

a longitudinal rotatable mount hinged to both ends of said hinge beam;

a longitudinal locking member coupled to said rotatable mount through two parallel connection pipes in a way such that the locking member is positioned in parallel to the rotatable mount, said locking member having a locking hook at a central portion thereof, said locking hook selectively engaging with said locking beam, thus selectively holding an upper part of said upper bag holder frame to the locking beam; and a curved support wire extending from each end of the rotatable mount to an associated end of the locking member so as to enlarge an upper support area of the holder frame for an uppermost bag.

5. The bowling ball carrier according to claim 1, wherein said bottom support frame comprises:

a fixed handle;

two parallel insert pipes perpendicularly extending from both ends of said fixed handle to a length, each of said insert pipes being stepped at a position around an inside end, thus having a small-diameter part and a large-diameter part; and a bracket projection formed on the large-diameter part of each insert pipe, thus allowing the bottom support frame to be screwed to bottom bosses of the wheeled bag.

6. The bowling ball carrier according to claim 1, wherein a woven fabric lid is attached to the front opening of said wheeled bag by sewing an outside edge of said fabric lid to a front edge of the wheeled bag, said lid having a fastener attached along an outside surface of the lid, thus being selectively openable.

7. The bowling ball carrier according to claim 1, wherein a synthetic resin lid, comprising two separate parts, is attached to the front opening of said wheeled bag by hinging the two separate parts to opposite sidewalls of the wheeled bag.

8. A bowling ball carrier comprising:

two parallel and telescopic columns each with a top and bottom end;

a main handle coupled to the top ends of both said telescopic columns;

a wheeled bag including a front, back, top, bottom and two side walls wherein said bottom ends of said telescopic columns are connected with said back wall of said wheeled bag and said front wall of said wheeled bag has a front opening capable of allowing a user to receive or remove bowling balls into or from the wheeled bag at the front of said bag, said wheeled bag having two fixed column holders;

a synthetic resin openable lid, comprising two separate parts, attached to the top opening of said wheeled bag by hinging the two separate parts to opposite sidewalls of the wheeled bag, said lid having a depression on a central portion of its top surface, thus seating a protruded botom of an upper bag in said depression; and an upper bag holder frame assembly having first and second support members used for removably holding first and second upper bags, respectively, in addition to the wheeled bag on the carrier, said upper bag holder frame having said first support member secured to the two fixed column holders of the wheeled bag and said second support member selectively attachable in locking engagement with a locking beam extending between middle portions of said two telescopic columns.

9. The bowling ball carrier according to claim 8; wherein said upper bag holder frame comprises:

two fixed support columns fixedly held by the two column holders of the wheeled bag at their lower ends, said two support columns being fixed to both ends of a connection beam at their upper ends;

two retractable columns slidably inserted into the upper ends of said support columns at their lower ends through both ends of the connection beam, thus forming a telescopic column structure;

a hinge beam holding top ends of said two retractable columns at its both ends;

a longitudinal rotatable mount hinged to both ends of said hinge beam;

a longitudinal locking member coupled to said rotatable mount through two parallel connection pipes in a way such that the locking member is positioned in parallel to the rotatable mount, said locking member having a locking hook at a central portion thereof, said locking hook selectively engaging with said locking beam, thus selectively holding an upper part of said upper bag holder frame to the locking beam; and a curved support -wire extending from each end of the rotatable mount to an associated end of the locking member so as to enlarge an upper support area of the holder frame for said second upper bag.

* * * * *